United States Patent [19]

Blumenstock et al.

[11] Patent Number: 5,205,263
[45] Date of Patent: Apr. 27, 1993

[54] TANK-VENTING APPARATUS AS WELL AS A METHOD AND AN ARRANGEMENT FOR CHECKING THE SAME

[75] Inventors: Andreas Blumenstock, Ludwigsburg; Helmut Denz, Stuttgart; Werner Mezger, Eberstadt; Ernst Wild, Oberriexingen, all of Fed. Rep. of Germany

[73] Assignee: Robert Bosch GmbH, Stuttgart, Fed. Rep. of Germany

[21] Appl. No.: 865,923

[22] Filed: Apr. 9, 1992

[30] Foreign Application Priority Data

Apr. 9, 1991 [DE] Fed. Rep. of Germany ....... 4111361

[51] Int. Cl.$^5$ ............................................. F02M 33/02
[52] U.S. Cl. ..................................... 123/520; 123/518
[58] Field of Search ................ 123/516, 518, 519, 520, 123/521, 198 D

[56] References Cited

U.S. PATENT DOCUMENTS

| | | | |
|---|---|---|---|
| 4,862,856 | 9/1989 | Yokoe et al. | 123/520 |
| 4,867,126 | 9/1989 | Yonekawa et al. | 123/198 D |
| 4,913,121 | 4/1990 | Shimomura et al. | 123/520 |
| 4,926,825 | 5/1990 | Ohtaka et al. | 123/520 |
| 4,945,885 | 8/1990 | Gonze et al. | 123/520 |
| 4,949,695 | 8/1990 | Uranishi et al. | 123/198 D |
| 4,962,744 | 10/1990 | Uranishi et al. | 123/520 |
| 5,048,493 | 9/1991 | Orzel et al. | 123/520 |
| 5,060,621 | 10/1991 | Cook et al. | 123/520 |
| 5,085,194 | 2/1992 | Kuroda et al. | 123/520 |
| 5,085,197 | 2/1992 | Mader et al. | 123/520 |
| 5,090,388 | 2/1992 | Hamburg et al. | 123/520 |
| 5,099,439 | 3/1992 | Saito | 123/520 |
| 5,105,789 | 4/1992 | Aramaki et al. | 123/520 |
| 5,113,834 | 5/1992 | Aramaki | 123/520 |

Primary Examiner—E. Rollins Cross
Assistant Examiner—Thomas N. Moulis
Attorney, Agent, or Firm—Walter Ottesen

[57] ABSTRACT

The invention is directed to a method of checking a tank-venting apparatus for a motor vehicle equipped with a fuel tank and an internal combustion engine having an intake pipe. The apparatus includes an adsorption filter having a venting end and an intake end, a supply line connecting the intake end to the tank and a connecting line interconnecting the intake pipe of the engine and the intake end of the adsorption filter. A tank-venting valve is mounted in the connecting line between the intake pipe and the intake end of the adsorption filter and a drive unit for actuating the tank-venting valve. The method includes the steps of: changing the open state of the tank-venting valve when a pregiven operating state range of the engine is present; detecting the difference pressure between the pressure at the intake end of the adsorption filter and the ambient pressure; checking if the difference pressure or the end value of the difference pressure change lies in a predetermined range after the open state of the tank-venting valve is changed; and, issuing a fault announcement if neither the difference pressure, the time constant of the difference pressure change nor the end value of the difference pressure change lies in said predetermined range. The invention utilizes the realization that the difference pressure is based on the gas flow into and out of the adsorption filter. The difference pressure drops when the outflow is clogged or when there is a leak. On the other hand, the difference pressure increases when the inflow is clogged. In this way, the operability of the tank-venting apparatus can be checked in a simple manner.

5 Claims, 2 Drawing Sheets

1

TANK-VENTING APPARATUS AS WELL AS A METHOD AND AN ARRANGEMENT FOR CHECKING THE SAME

FIELD OF THE INVENTION

The invention relates to a tank-venting apparatus for a motor vehicle having an internal combustion engine as well as a method and an arrangement for checking the apparatus for defects such as leaks, clogged lines or defective valves.

BACKGROUND OF THE INVENTION

Tank-venting apparatus having the following features have been known for some time: an adsorption filter having a venting opening at its venting end and an intake end to which a supply line from the tank is connected; a tank-venting valve which is connected into a connecting line between the intake pipe of the engine and the intake end of the adsorption filter; and, a drive unit for the tank-venting valve.

The drive unit controls the tank-venting valve in a fixed pregiven time sequence. For example, the drive unit holds the valve closed each time for 1.5 minutes and then opens the valve each time for 4 minutes in order to make possible a regeneration of the adsorption filter. The opening cross section of the tank-venting valve is then determined over a pulse-duty factor dependent upon the particular operating state. For small loads and especially during idle, the tank-venting valve is driven with such a pulse-duty factor that its mean opening cross section is small; whereas, at full load, the valve is kept completely open during the above-mentioned 4 minutes (the so-called tank-venting phase) with the precondition that full load is present for the entire time duration. The highest throughput of ventilating air is present in an upper load range below full load.

It is apparent that tank-venting apparatus of the above kind can only then operate fully satisfactorily when they are tight and when the tank-venting valve opens and closes properly. For checking the apparatus, a method is known according to which an investigation is made especially at low loads as to whether the lambda controller on an internal combustion engine, which is supplied with the gas from the tank-venting apparatus, must make a lean correction during the tank-venting phase. If this is the case, an indication is provided that fuel vapor was supplied from the apparatus. However, this case applies only when the apparatus is tight and the tank-venting valve opens properly. However, no unequivocal statement is made if no lean correction is determined. It is possible that the fuel in the tank does not release vapor so that no fuel vapor is supplied from the apparatus notwithstanding a completely operational tank-venting apparatus.

In order to obtain more reliable data, the California Environmental Authority (CARB) issued a directive in 1989 according to which a tank-venting apparatus is checked in that a level sensor and a temperature sensor are mounted in the tank and the signals of these sensors are evaluated. If the level sensor indicates that fuel has been tanked and at the same time the temperature sensor indicates that the fuel should vaporize adequately, the check as to the above-mentioned lean correction should be made. However, if fuel is added to the tank which has been fully vaporized, then the fuel temperature must be relatively high if an adequate quantity of fuel is to vaporize for a detectable lean correction. If the temperature at which the lean correction investigation is to be carried out is set so high that the vaporized fuel vaporizes adequately for a reliable measurement result, then no diagnosis is undertaken during cold weather and over many trips even though one diagnosis per trip is desired.

SUMMARY OF THE INVENTION

In view of the foregoing, it is an object of the invention to provide a reliable method for checking a tank-venting apparatus as well as a corresponding checking arrangement and an appropriately equipped tank-venting apparatus.

The method of the invention is for checking a tank-venting apparatus for a motor vehicle equipped with a fuel tank and an internal combustion engine having an intake pipe. The tank-venting apparatus includes an adsorption filter having a venting end and an intake end, a supply line connecting the intake end to the tank, a connecting line interconnecting the intake pipe of the engine and the intake end of the adsorption filter, a tank-venting valve mounted in the connecting line between the intake pipe and the intake end of the adsorption filter and a drive unit for actuating the tank-venting valve. The method of the invention includes the steps of: changing the open state of the tank-venting valve when a pregiven operating state range of the engine is present; detecting the difference pressure between the pressure at the intake end of the adsorption filter and the ambient pressure; checking if the difference pressure or the end value of the difference pressure change lies in a predetermined range after the open state of the tank-venting valve is changed; and, issuing a fault announcement if neither the difference pressure, the time constant of the difference pressure change nor the end value of the difference pressure change lies in the predetermined range.

The arrangement of the invention is for checking a tank-venting apparatus of the kind described. The arrangement of the invention includes: operating state monitoring means for monitoring the operating state of the engine and for emitting a signal to the drive unit for changing the extent to which the valve opens as soon as the operating state is in a pregiven range; a difference pressure sensor for measuring the difference pressure between the pressure at the intake end of the adsorption filter and the ambient pressure; fault investigative means for investigating whether the difference pressure or the time constant of the difference pressure change or the end value of the difference pressure change lies in a predetermined range after the open state of the tank-venting valve is changed; and, means for issuing a fault announcement if neither the difference pressure, the time constant of the difference pressure nor the end value of the difference pressure change lies in the predetermined range.

The tank-venting apparatus of the invention includes the features of the above-mentioned arrangement and, in addition thereto, a difference-pressure sensor which is so mounted that the sensor measures the difference pressure between the pressure at the intake end of the adsorption filter and the ambient pressure.

The realization is utilized that the above-mentioned difference pressure is dependent on the extent of the flows into and out of the adsorption filter. When the fuel vaporizes only a small amount, which is usually the case, and the venting opening of the adsorption filter is not clogged, a specific underpressure must self-adjust during a specific operating state of the engine when the tank-venting valve is opened. If the underpressure is greater, this indicates that the expected quantity of air does not flow in through the venting opening so that this opening is partially or entirely clogged. In contrast, if the difference pressure is less than expected, then a leak is present somewhere between the intake pipe and the tank or the connecting line having the tank-venting valve is clogged between the intake pipe and the adsorption filter or the fuel in the tank vaporizes intensely. The last of these three cases can be distinguished from the first two with the aid of a so-called charging measurement, such as the already mentioned monitoring of a lean correction performed by a lambda controller.

It is advantageous to evaluate difference pressure changes in order to make the measurement independent of inaccuracies in the absolute difference pressure detection.

Especially reliable data can also be obtained if the time constant of the difference-pressure change is monitored during locking of the tank-venting valve. If no difference pressure is determined at the beginning of this measurement, then this is an indication that the connecting line having the tank-venting valve leaks or is clogged between the intake pipe and the adsorption filter. If underpressure is present, then the reduction of the pressure is no longer dependent on some pressure dynamic in the above-mentioned connecting line; instead, the underpressure reduction is only dependent on the flows into the adsorption filter through the venting line and through the connecting line to the tank. If the time constant of the reduction of the underpressure is greater than expected, this shows that the venting opening is clogged. If, on the other hand, the time constant is reduced, this shows the inflow of leakage air or of gas from the tank. These two last-mentioned cases can however not be clearly separated from each other. The measurement when closing the tank-venting valve instead of when opening the same also has the advantage that the evaluation can be started with the measured difference pressure and, starting from this value, the time constant of the decaying difference pressure is determined. In the case of the opening of the tank-venting valve, an expected value for the pressure difference must be read out in dependence upon the particular operating state of the engine.

It is advantageous to carry out the method during operating states in the upper load range of the engine but not at full load. In these operating states, opening or closing of the tank-venting valve has no effect on the smooth-running performance of the engine. Furthermore, high gas throughputs are present which lead to significant difference pressures. In contrast, at full load, the difference pressures which can be expected are too small for reliable measurements. If measurements are taken outside of the above-mentioned preferred range, that is at relatively low loads, then the tank-venting valve may not be opened suddenly or be fully closed starting from a completely open state; instead, the valve can be driven in each case only to intermediate states by an appropriate drive of the valve.

Preferably, the above-mentioned investigations are carried out only during the above-mentioned tank-venting phases. Here, it is sufficient that the particular investigative program is carried out only once each time the engine is started.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
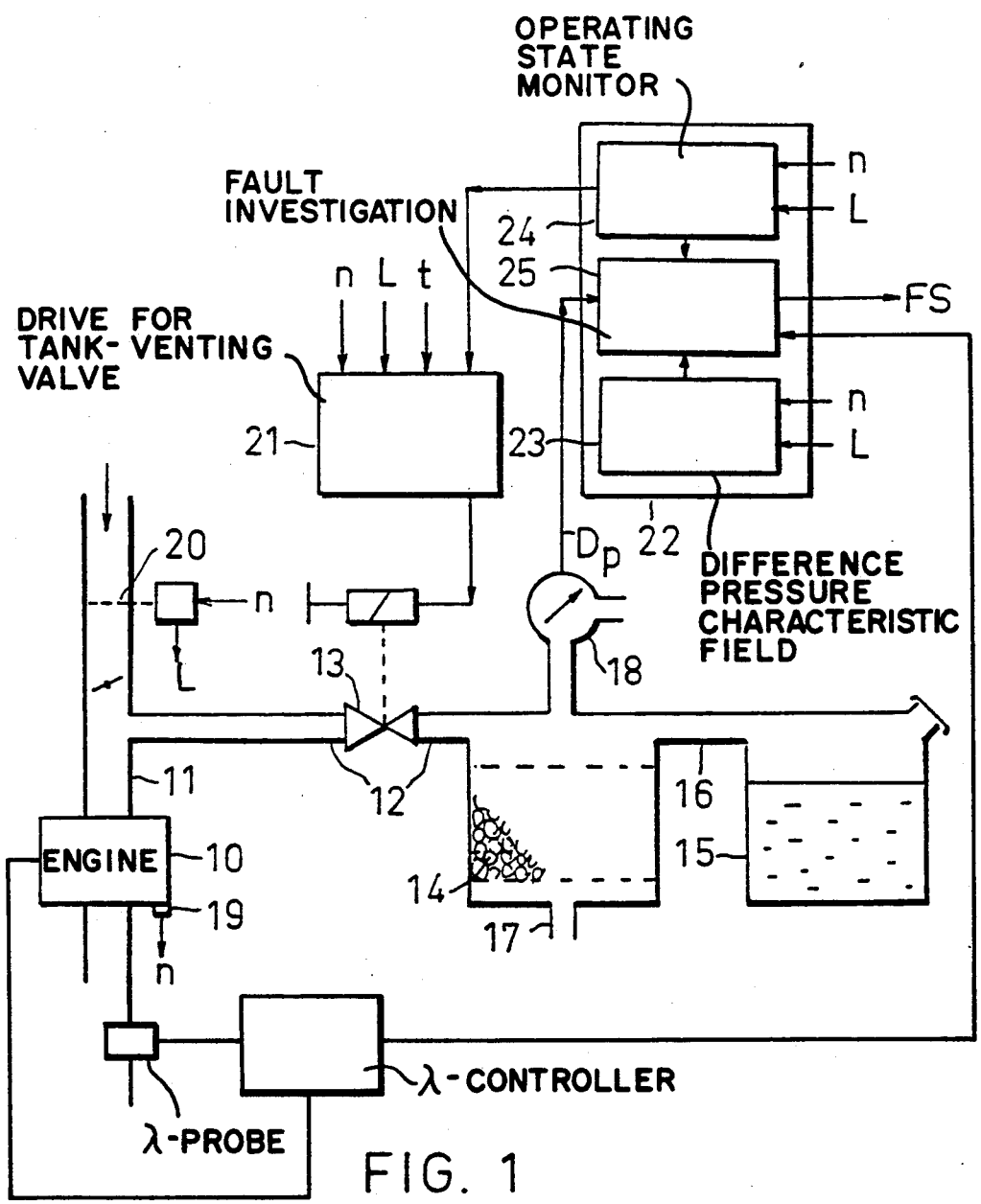
FIG. 1 is a schematic of a tank-venting apparatus and an arrangement for checking the apparatus as to the operability thereof; and, FIG. 2 is a flowchart for explaining an embodiment of the method of the invention for checking the operability of a tank-venting apparatus having a difference-pressure sensor on the adsorption filter of the apparatus.

The tank-venting apparatus shown in FIG. 1 is arranged on an internal combustion engine 10 having an intake pipe 11. The tank-venting apparatus includes a connecting line 12 having a tank-venting valve connected between the intake pipe 11 and an adsorption filter 14 as well as a supply line 16 leading from the adsorption filter 14 to a tank 15. A venting line 17 opens into the adsorption filter 14 at the bottom thereof at the venting end of this filter. The connecting line 12 and the supply line 16 are connected at the upper intake end of the filter as is a difference-pressure sensor 18 which measures the difference pressure Dp between the pressure on the intake end of the adsorption filter 14 and the ambient pressure.

An engine-speed sensor 19 is provided on the engine 10 for determining the engine speed (n). An air-flow sensor 20 is mounted in the intake pipe 11 to detect the air mass flowing into the engine. The air-flow sensor supplies a load signal L. The engine speed (n) and the load L function to determine the operating state of the engine 10. The operating state is furthermore dependent upon the time (t) in that during a fixed time sequence, an operation with and without tank venting takes place alternately.

For the operation with or without tank venting, the tank-venting valve 13 is driven by a drive unit 21 in a manner known per se so that for each operating state, a corresponding pulse-duty factor of the valve is adjusted. Furthermore, and according to a feature of the invention, the drive unit 21 also receives a signal from the monitoring device 22 which operates to check the operability of the tank-venting apparatus.

The monitoring device 22 includes the following: a difference-pressure characteristic field 23, an operating-state monitoring unit 24 and a fault-investigating unit 25. The operating-state monitoring unit can determine if an operating state is present which is suitable for making a check as to the operability of the apparatus based on values received of engine speed (n) and load L. When this occurs, the monitoring device 22 emits a signal to the drive unit 21 which indicates to the drive unit that the drive unit is to reset the tank-venting valve 13 to an open position requested in accordance with the signal. The fault-investigating unit 25 then detects the difference pressure occurring because of this adjustment of the tank-venting valve and compares this difference pressure to an expected difference pressure as it is emitted in dependence upon the actual values of engine speed (n) and load L from the difference-pressure characteristic field 23. If the actual difference pressure deviates too greatly from the expected difference pressure, a fault signal FS is emitted.

A method outlined above for checking the tank-venting apparatus will now be explained in greater detail with reference to FIG. 2.

Figure 2:
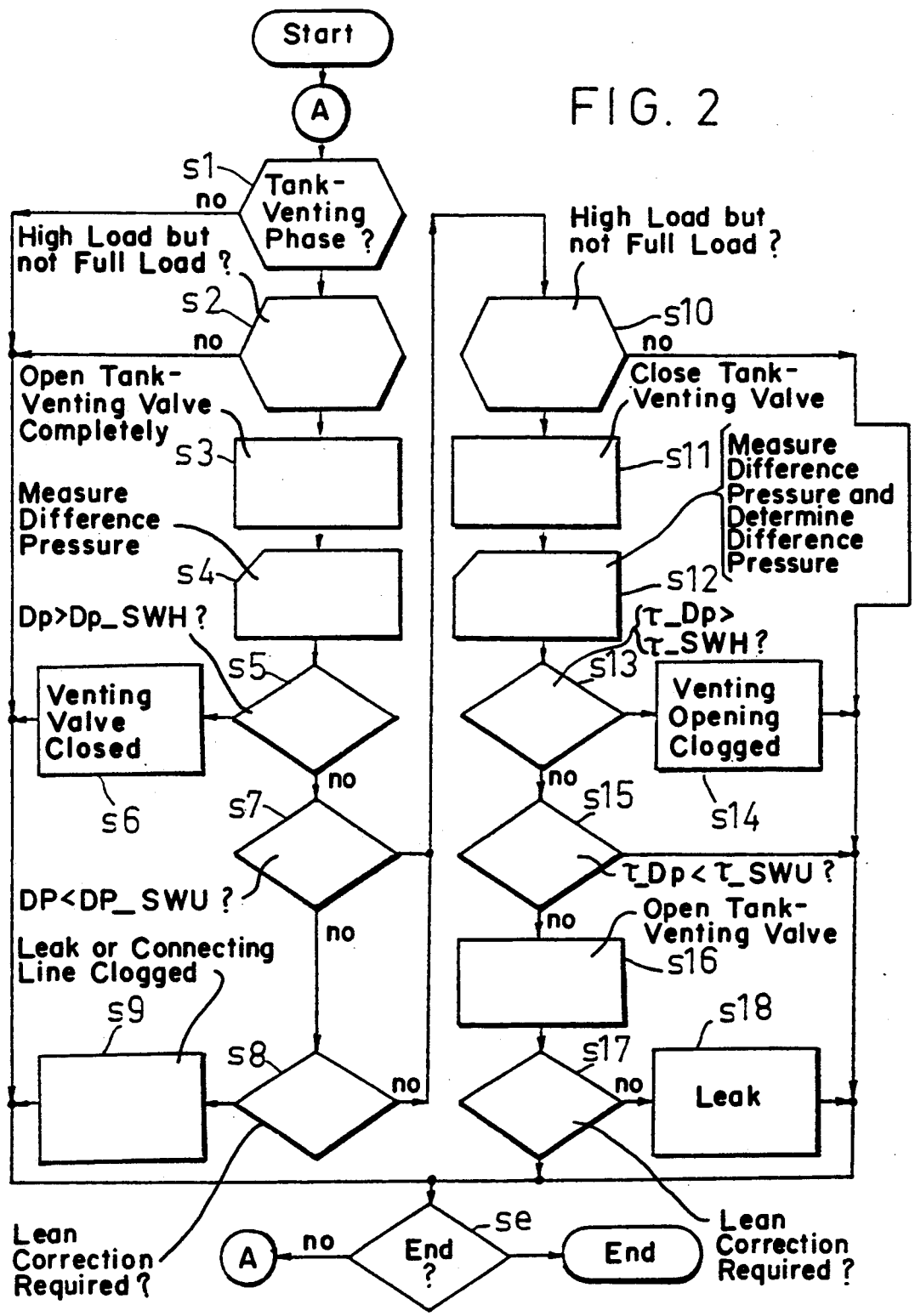

In a step s1, after the start of the method of FIG. 2, a check is made as to whether one of the parameters, which describe overall the operating state of the engine 10, indicates whether a tank-venting phase is present. If this is not the case, a check is made as to whether the method should be ended in an end step se. If this too is not the case, step s1 is repeated. If it occurs that a tank-venting phase has begun after a repeated pass-through of step s1, then a check is made in a step s2 as to whether an upper load range, but not full load, is present. If this is not the case, the end step se follows again; otherwise, the tank-venting valve is opened completely (step s3) and the difference pressure Dp which has adjusted is measured (step s4). A high threshold Dp_SWH is formed from a value read out from the difference-pressure characteristic field 23 by adding a fixed value thereto. If the difference pressure Dp is above this high threshold Dp_SWH (step s5), then this indicates that the venting line of the adsorption filter is clogged. This is indicated in a step s6 as a fault announcement. This fault announcement can be read into a memory in order to localize the nature of the fault during a diagnosis at the service station and the fault can be indicated to a driver by activating a warning lamp. Thereafter, the end step se is reached and the sequence is ended there.

If in step s5, it occurs that the difference pressure Dp does not exceed the above-mentioned threshold, then in a step s7, an investigation is made as to whether the difference pressure lies below a lower threshold value Dp_SWU which, in turn, is formed from the value read out of the characteristic field; however, this time by subtracting a fixed value. If there is a drop below the threshold, then either a leak on the intake end of the adsorption filter is present or, the connecting line including the tank-venting valve can be clogged or, a large quantity of fuel vapor can be coming from the tank. In order to distinguish the last case from the two other cases, a check is made in a step s8 as to whether a lambda controller corresponding to the engine 10 carries out a lean correction. If this is the case, then the proper operation of the apparatus is indicated. Otherwise, a fault announcement is emitted in a step s9 that either a leak at the intake end is present or the connecting line is clogged. Then step se follows again wherein the sequence is ended.

In the event that the question put in step s7 or step s8 is answered in the negative, the method continues with a step s10 which corresponds to step s2. If no operating state in the upper load range is present any longer, then the end step se is reached; otherwise, the tank-venting valve is again closed (step s11). The closure at the end of the tank-venting phase is not necessarily awaited since, at this time point and under certain circumstances, an operating state suitable for an evaluation may no longer be present. Starting from the instant of the closure of the tank-venting valve, the difference pressure Dp is measured until this pressure has dropped to approximately one third of its starting value. This time duration is evaluated (step s12) as time constant $\tau\_DP$ of the decay of the pressure difference. If this time constant is above a high threshold $\tau\_SWH$ (step s13), this shows that gas flows slower to the intake end than expected. This can only be the case if the venting opening is clogged. A corresponding fault is then emitted in a step s14 which is again followed by the end step se. However, if it develops in step s13 that the above-mentioned high threshold is not exceeded, a check is made in step s15 as to whether a drop occurs below a threshold $\tau\_SWU$. This can be the case either when a great quantity of air blows toward the intake end through a leak or a great quantity of fuel vapor from the tank flows to the intake end. In order to distinguish between these two cases, if there is a drop below the above-mentioned threshold, the tank-venting valve is opened in dependence upon the operating state (step s16); that is, such a pulse-duty factor is adjusted that the fuel vapor quantity to be expected in the case of an intact tank-venting apparatus does not lead to a rough running of the engine. Thereafter, a check (step s17) is made as to whether the lambda controller 26 of the engine must undertake a lean correction when the tank-venting valve is opened. If this is the case, the end step se is reached directly. Otherwise, a warning announcement step s18 is interjected by means of which an indication is provided that a leak is present. The end step se is also reached when the result is obtained in step s15 that there was no drop below the lower threshold.

The sequence described with respect to FIG. 2 can be changed in many ways. For example, in lieu of the absolute difference pressure as measured in step s4, the difference-pressure change when opening the tank-venting valve can be measured. In this case, one would not wait with the measurement until it was determined in step s1 that the tank-venting phase has begun; instead, the first measurement would already be made at the end of the previous phase in order, with the aid of this value, to be able to determine the change to the pressure difference which would then adjust. This affords the advantage that the measuring errors would be eliminated for the absolute pressure detection of the difference pressure.

A further possibility of change would be that only one of the two investigations of FIG. 2 would take place, namely, either that with the aid of the absolute difference pressure or, that with the aid of the time-dependent change of the difference pressure after the closure of the tank-venting valve. A further possible embodiment would be that the second measuring method according to FIG. 2 would still be carried out if the first measuring method has already led to a fault announcement in order to check whether the second method confirms the fault.

Overall, the determination can be made that the decision as to whether a judgment with the aid of the absolute difference pressure or the time constant or the end value of the difference-pressure change or a combination of the evaluations based on these variables takes place is dependent very much on the flow conditions in the adsorption filter which, in turn, are based on the mechanical configuration of the apparatus. Especially conduit cross sections and possible overpressure or underpressure valves influence the flow conditions.

In one embodiment of the invention, measurements where made in the upper load range of a 2.5 liter, 6-cylinder engine wherein difference pressures of 100 mbar were adjusted with the tank-venting valve being fully open for at least one half of a second. With a complete closure of the tank-venting valve thereafter, it took several seconds with the proper functioning of the apparatus until the difference pressure dropped to a third of its initial value. With the venting line clogged, somewhat higher difference pressures and significantly extended decay times were measured. Even for relatively small leaks, the difference pressure and the decay time were considerably reduced.

It is understood that the foregoing description is that of the preferred embodiments of the invention and that various changes and modifications may be made thereto without departing from the spirit and scope of the invention as defined in the appended claims.

What is claimed is:

1. A method of checking a tank-venting apparatus for a motor vehicle equipped with a fuel tank and an internal combustion engine having an intake pipe, the apparatus including an adsorption filter having a venting end and an intake end, a supply line connecting the intake end to the tank, a connecting line interconnecting the intake pipe of the engine and the intake end of the adsorption filter, a tank-venting valve mounted in the connecting line between the intake pipe and the intake end of the adsorption filter and a drive unit for actuating the tank-venting valve, the method comprising the steps of:

at least partially opening the tank-venting valve when a pregiven state of the engine is present and the completely closing said valve when said pregiven operating state range is present;

detecting the difference pressure between the pressure at the intake end of the adsorption filter and the ambient pressure;

detecting the time-dependent course of said difference pressure starting at the time point of the closing of said valve;

checking if the decay time constant of said difference pressure is in a pregiven region; and, if not, issuing a fault announcement.

2. The method of claim 1, further comprising the steps of:

detecting said decay time constant; and checking if said decay time constant lies in a pregiven region and, if not, checking if there is a lean correction by the lambda controller present; and, if not, concluding that there is a leak in the apparatus if said lean correction is indeed not present.

3. The method of claim 1, further comprising the steps of:

detecting said decay time constant;

checking whether the decay time constant is greater than a threshold, and, if so, concluding the vent opening is clogged.

4. The method of claim 1, wherein said pregiven operating state range corresponds to the upper load range of the engine short of the full-load range.

5. In a motor vehicle which includes a fuel tank and an internal combustion engine having an intake pipe and a tank-venting apparatus, the tank-venting apparatus including an adsorption filter having an intake end and a venting end, a supply line interconnecting the intake end of the adsorption filter and the fuel tank, a connecting line interconnecting the intake end of the adsorption filter and the intake pipe and a tank-venting valve mounted in the connecting line between the intake end of the adsorption filter and the intake pipe, and a drive unit for actuating the tank-venting valve, an arrangement for checking the tank-venting apparatus, the arrangement comprising:

operating state monitoring means for monitoring the operating state of said engine and for emitting a signal to said drive unit for changing the extent to which the valve opens as soon as the operating state is in a pregiven range;

drive means for at least partially opening the tank-venting valve when a pregiven operating state of the engine is present and then completely closing said valve when said pregiven operating state range is present;

a difference pressure sensor for measuring the difference pressure between the pressure at said intake end of said adsorption filter and the ambient pressure;

means for detecting the time-dependent course of said difference pressure starting at the time point of the closing of said valve;

means for checking if the decay time constant of said difference pressure is in a pregiven region;

fault investigative means for investigating whether said time constant of said difference pressure lies in a predetermined range; and, means for issuing a fault announcement if said time constant of said difference pressure does not lie in said predetermined range.

* * * * *

UNITED STATES PATENT AND TRADEMARK OFFICE
CERTIFICATE OF CORRECTION

PATENT NO. : 5,205,263

DATED : April 27, 1993

INVENTOR(S) : Andreas Blumenstock, Helmut Denz, Werner Mezger and Ernst Wild

It is certified that error appears in the above-identified patent and that said Letters Patent is hereby corrected as shown below:

In column 7, line 22: delete "the" (second occurrence) and substitute -- then -- therefor.

In column 7, line 36: after "and", please insert -- , --.

Signed and Sealed this

Fourth Day of January, 1994

Attest:

BRUCE LEHMAN

*Attesting Officer*        *Commissioner of Patents and Trademarks*